US012661770B2

(12) United States Patent
Tran

(10) Patent No.: US 12,661,770 B2
(45) Date of Patent: Jun. 23, 2026

(54) FOLDABLE DEMOLITION HAMMER TROLLEY

(71) Applicant: Xuong Tran, West Covina, CA (US)

(72) Inventor: Xuong Tran, West Covina, CA (US)

( * ) Notice: Subject to any disclaimer, the term of this patent is extended or adjusted under 35 U.S.C. 154(b) by 155 days.

(21) Appl. No.: 18/763,954

(22) Filed: Jul. 3, 2024

(65) Prior Publication Data

US 2026/0008167 A1 Jan. 8, 2026

(51) Int. Cl.
*B25D 17/32* (2006.01)
*B25D 17/28* (2006.01)

(52) U.S. Cl.
CPC ........ *B25D 17/28* (2013.01); *B25D 2250/115* (2013.01)

(58) Field of Classification Search
CPC ........ B25D 17/32; B25D 17/28; B25D 17/04; B25D 17/043; B25D 2250/115; B62B 1/02; B62B 1/04; B62B 3/022; E04G 23/006; B28D 1/28
See application file for complete search history.

(56) References Cited

U.S. PATENT DOCUMENTS 3,627,064 A * 12/1971 Sjoberg .................. B25D 17/32 173/24
5,462,127 A * 10/1995 Svensson ............... B25D 17/28 173/162.1
9,844,868 B1 * 12/2017 Abbey ................... B25D 17/24
2010/0059949 A1 * 3/2010 Kennard .............. B25D 17/043 280/47.21
2013/0098649 A1 * 4/2013 Charbonneau ......... B25D 17/32 173/185
2017/0138072 A1 * 5/2017 Tailly ..................... B25D 17/32
2018/0085907 A1 * 3/2018 Wilson ..................... B62B 5/065
2019/0168370 A1 * 6/2019 Boswell ................ E04D 15/003
2020/0206885 A1 * 7/2020 Pyron ...................... B62B 1/002
2024/0141730 A1 * 5/2024 Sommers .................. B62B 1/12

* cited by examiner

*Primary Examiner* — Carib A Oquendo
(74) *Attorney, Agent, or Firm* — Elizabeth Yang

(57) ABSTRACT

The present invention provides a foldable demolition hammer trolley designed for floor removal operations. It comprises a first frame with a main rod, a moving assembly, and a pedal assembly. The moving assembly, located at the main rod's bottom end, includes a fixed axle and wheels. One side of a connecting part of the pedal assembly connects pivotally to the fixed axle and the other side is fixedly to a pedal pad. The second frame is pivotally attached to the first frame and includes a support frame part, a carrying frame part, a telescopic sleeve rod, an adjustment member, and first and second fixing assemblies. The support and carrying frame parts are pivotally connected. The telescopic sleeve rod and adjustment member between them allow distance adjustment. The fixing assemblies secure the demolition hammer's handle and body. This can reduce the force required by the operator.

20 Claims, 12 Drawing Sheets

25

FOLDABLE DEMOLITION HAMMER TROLLEY

BACKGROUND OF THE DISCLOSURE

Technical Field

The present disclosure relates to the field of engineering machinery tools, specifically to a foldable demolition hammer trolley that is easy to fold, store, and carry, and significantly reduces the effort required by the operator.

Description of the Related Art

Demolition hammers are very common tools, mostly used for tasks such as demolishing concrete walls, floors, and other hard structures. These tools can easily break and remove heavy concrete, especially floor coverings like tiles and wooden floors. They are also used to break and remove old asphalt pavements for road maintenance and resurfacing, as well as effectively demolishing and removing structural materials during the demolition of old buildings.

A common issue when using these tools is their significant weight, which requires operators to hold and operate them for extended periods, leading to fatigue and increased risk of injury. Specifically, demolition hammers typically weigh over 10 kg and require the operator to exert pressure during use. This weight and continuous use can place considerable strain on the operator's arms, shoulders, and back. Additionally, prolonged use of these tools often forces operators to maintain poor working postures for extended periods, such as bending, squatting, or standing for long durations. These poor postures further increase the burden on muscles and joints, potentially causing muscle pain, spasms, or even injuries. Over time, accumulated fatigue and pain can slow the operator's reaction time and reduce their focus, thereby increasing the risk of accidents and injuries. Therefore, developing tools that are easier for operators to use can effectively promote smoother operation and reduce physical exertion.

In view of this, our invention team has conceived and proposed a foldable demolition hammer trolley that enables operators to perform floor demolition tasks with greater ease.

SUMMARY OF THE DISCLOSURE

It is a primary objective of the present disclosure to provide a foldable demolition hammer trolley that allows operators to perform floor demolition tasks without exerting excessive back strength, thereby effectively eliminating the fatigue and injuries associated with prolonged use of demolition hammers. Additionally, this foldable demolition hammer trolley is easy to store and convenient to transport.

To achieve the aforementioned objective, the present disclosure discloses a foldable demolition hammer trolley for setting an demolition hammer to perform floor removal tasks, comprising: a first frame, including: a first frame, including: a main rod; a moving assembly mounted at the bottom end of the main rod, including a fixed axle and two wheels, with the two wheels respectively mounted at opposite ends of the fixed axle and positioned on opposite sides of the main rod; a pedal assembly, including a connecting part and a pedal pad, with the pedal pad fixed to one side of the connecting part, and the other side of the connecting part pivotally connected to the fixed axle, allowing the pedal assembly to be folded close to or away from the main rod;

a second frame, pivotally attached to one side of the first frame, including: a support frame part, with one end pivotally connected to the main rod, allowing the support frame part to be folded close to or away from the main rod; a carrying frame part, pivotally connected at the opposite end of the main rod relative to the support frame part, allowing the carrying frame part to be folded close to or away from the support frame part; at least one telescopic sleeve rod, with one end fixed to the support frame part and the other end fixed to the carrying frame part, positioned between the support frame part and the carrying frame part; an adjustment member, positioned between the support frame part and the carrying frame part, used to adjust the angle between the carrying frame part and the support frame part; a first fixing assembly, positioned on the carrying frame part at the side opposite to where the telescopic sleeve rod is connected, used to fix the handle of the demolition hammer; a second fixing assembly, positioned on the carrying frame part at the side opposite to where the telescopic sleeve rod is connected and corresponding to the first fixing assembly, used to fix the body of the demolition hammer. In the usage state, the pedal assembly of the first frame is pivoted such that the pedal pad rests on the ground, and the carrying frame part and the support frame part of the second frame are pivoted to expand, allowing the demolition hammer to be fixed to the carrying frame part in an inclined state. Thus, the operator can use the pedal pad to leverage the demolition hammer with greater force, making floor removal tasks easier and effectively preventing the adverse effects of prolonged operation. Additionally, the foldable design, with components pivotally connected to fold together, makes the foldable demolition hammer trolley easy to store and carry.

In another embodiment, the pedal assembly further includes at least one auxiliary wheel, which is mounted on the connecting part to facilitate movement.

In yet another embodiment, the connecting part includes two rods, symmetrically arranged, each equipped with the auxiliary wheel, making the overall structure more stable and easier to move.

In one embodiment, the first fixing assembly includes a length adjustment piece and a clamping piece. One end of the length adjustment piece is fixed to the carrying frame part; the clamping piece includes a first body and a second body arranged oppositely, with the first body fixed to the end of the carrying frame part opposite the length adjustment piece. The length adjustment piece is used to adjust the distance between the clamping piece and the carrying frame part; the clamping piece can pivot relative to the length adjustment piece, securing the handle of the demolition hammer within the space formed by the first body and the second body, allowing for adjustments according to the type of demolition hammer.

Furthermore, in another embodiment, the length adjustment piece includes a fixed rod and a sliding component. The fixed rod is attached to the carrying frame part, one end of the sliding component is mounted on the fixed rod, and the other end is pivotally connected to the clamping piece; the sliding component can slide relative to the fixed rod, making it easier to move the clamping piece.

Preferably, in another embodiment, the first body has a first arc section and two first extension sections, with the two first extension sections located on opposite sides of the first arc section. The second body has a second arc section and two second extension sections, with the two second extension sections located on opposite sides of the second arc section, making the first body and the second body each form an Ω shape; wherein, the two first extension sections and the two second extension sections are positioned to butt against each other, and a locking piece is set at the locations of the two first extension sections and the two second extension sections, allowing for adjustment of the space formed between the first body and the second body to accommodate the demolition hammer.

In one embodiment, the second fixing assembly includes a first fixed main body, a second fixed main body, a third fixed main body, and a fourth fixed main body. One side of the first fixed main body is connected to the carrying frame part; the second fixed main body is mounted on the opposite side of the first fixed main body relative to the carrying frame part. The third fixed main body is located on one side of the second fixed main body and is connected to it. The fourth fixed main body is located on one side of the first fixed main body, with one side of the fourth fixed main body connected to the carrying frame part and the other side connected to the third fixed main body. The first fixed main body, the second fixed main body, the third fixed main body, and the fourth fixed main body combine to form a frame with a quadrilateral outer contour. The body of the demolition hammer is fixed within the space formed by the first fixed main body, the second fixed main body, the third fixed main body, and the fourth fixed main body, and the distances between the first fixed main body, the second fixed main body, the third fixed main body, and the fourth fixed main body are adjustable. This provides excellent fixation relative to the demolition hammer and allows for adjustments based on the structural state of the demolition hammer.

Furthermore, in another embodiment, the carrying frame part has a track. The first fixed main body and the fourth fixed main body are respectively movably installed in the track and can move within the track to adjust the distance between the first fixed main body and the fourth fixed main body. The first fixed main body has a first assembly insert. The second fixed main body has a second assembly insert and a first assembly hole. The third fixed main body has a third assembly insert and a second assembly hole. The fourth fixed main body also has a third assembly hole. The first assembly insert is inserted into the first assembly hole, the second assembly insert is inserted into the second assembly hole, and the third assembly insert is inserted into the third assembly hole. The first assembly insert can slide within the first assembly hole to adjust the distance between the first fixed main body and the second fixed main body, the second assembly insert can slide within the second assembly hole to adjust the distance between the second fixed main body and the third fixed main body, and the third assembly insert can slide within the third assembly hole to adjust the distance between the third fixed main body and the fourth fixed main body. Thus, the first fixing assembly can adjust its size to accommodate various types of demolition hammers.

Preferably, the first fixed main body and the fourth fixed main body are respectively installed in the track through a connecting piece; the first fixed main body also has a first carrying insert, the fourth fixed main body also has a second carrying insert, and both the first carrying insert and the second carrying insert are placed within the track. Through the aforementioned structural features, the first fixed main body and the second fixed main body can move more stably along the track, thereby enhancing the stability of the carrying frame part when mounting the demolition hammer for application.

In a better application example, the first fixed main body also includes a first L-shaped section and a first dividing section. The first dividing section is inclined, and its ends are respectively connected to the opposite ends of the first L-shaped section, forming a first pentagonal frame. The first carrying insert extends from one end edge of the first L-shaped section, while the first assembly insert extends from the other end edge of the first L-shaped section in the opposite direction to the first carrying insert. The second fixed main body features a second L-shaped section and a second dividing section. The second dividing section is inclined, and its ends are respectively connected to the second L-shaped section, also forming a second pentagonal frame. The second assembly insert extends from one end edge of the second L-shaped section, and the first assembly hole is recessed from the other end edge of the second L-shaped section. The third fixed main body additionally has a third L-shaped section and a third dividing section. The third dividing section is inclined, and its ends are respectively connected to the third L-shaped section, forming a third pentagonal frame. The third assembly insert extends from one end edge of the third L-shaped section, and the second assembly hole is recessed from the other end edge of the third L-shaped section. The fourth fixed main body includes a fourth L-shaped section and a fourth dividing section. The fourth dividing section is inclined, and its ends are respectively connected to the fourth L-shaped section, forming a fourth pentagonal frame. The third assembly hole is recessed from one end edge of the fourth L-shaped section, while the second carrying insert extends from the other end edge of the fourth L-shaped section; wherein the first pentagonal frame and the second pentagonal frame are arranged in a mirrored configuration, the second pentagonal frame and the third pentagonal frame are arranged in a mirrored configuration, the third pentagonal frame and the fourth pentagonal frame are arranged in a mirrored configuration, and the fourth pentagonal frame are arranged in a mirrored configuration with the first pentagonal frame.

Additionally, in one embodiment, the first fixed main body and the second fixed main body are further secured together by a first screw, which passes through between the first dividing section and the second dividing section. The third fixed main body and the fourth fixed main body are similarly secured together by a second screw, which passes through between the third dividing section and the fourth dividing section. This arrangement enhances the overall assembly strength of the first to fourth fixing bodies after adjusting to the desired spacing.

In another embodiment, it is disclosed that the maximum spacing of the space formed by clamping the first fixed main body, the second fixed main body, the third fixed main body, and the fourth fixed main body is between 2 to 4 inches, suitable for various types of demolition hammers.

In one embodiment, the main rod assembly includes a first rod portion and a second rod portion. The bottom end of the first rod portion is assembled with the moving assembly, while the second rod portion is assembled at the top end of the first rod portion. The second rod portion is detachably structured relative to the first rod portion, and the end of the second rod portion opposite to the assembly with the first rod portion has a handle for adjusting the length of the main rod assembly according to operational needs.

Preferably, the bottom end of the second rod portion is inserted into the top end of the first rod portion and secured together through a pin, providing the advantage of quick assembly and disassembly.

Additionally, in one embodiment, the length of the second rod portion ranges from 25 to 30 inches, aiming to enhance leverage and reduce the force exerted on the operator's back during operation.

For ease of adjusting the distance between the carrying frame part and the support frame part, the adjusting member is a band. One end of the adjusting member is fixed to the support frame part, and the other end is connected to the carrying frame part in a movable manner. By changing the total length of the adjusting member, the angle between the carrying frame part and the support frame part can be altered.

Additionally, in one embodiment, it is disclosed that the telescopic rod is an elastic rod, used to provide the force to push the carrying frame part outward, thereby stabilizing the support frame part and the carrying frame part during operation.

In one embodiment, it is revealed that there is a bolt between the main rod assembly and the support frame part, and by adjusting the tightness of the bolt, the main rod assembly can move back and forth relative to the pedal assembly, enhancing the overall adjustability of the mechanism.

In a preferable storage application scenario, wherein the first fixing assembly has a first space and is a detachable structure, and the second fixing assembly has a second space and is a detachable structure, so that in the folded state, the main rod passes through the first space and/or the second space and is secured. Thus, the entire mechanism can be secured after folding by the first fixed main body and the second fixed main body, making it easier to carry and move.

Additionally, considering force distribution during operation and smooth movement, in one embodiment, the wheelbase of the two wheels is between 7 to 11 inches, facilitating easier and more convenient use of the entire mechanism.

In summary, the foldable demolition hammer trolley of the present invention is designed with a special frame structure. During floor demolition operations, it allows operators to apply sufficient force to drive the demolition hammer leveraging the leverage effect without excessive strain on the back muscles. This effectively addresses the adverse effects caused by relying solely on personal strength during prolonged work periods. Additionally, the foldable nature of this invention provides excellent convenience for storage, transportation, and travel. Furthermore, the present invention introduces more detailed structural features tailored to the foldable demolition hammer trolley, as described in the preceding paragraphs.

DETAILED DESCRIPTION OF THE PREFERRED EMBODIMENTS

Figure 1A:
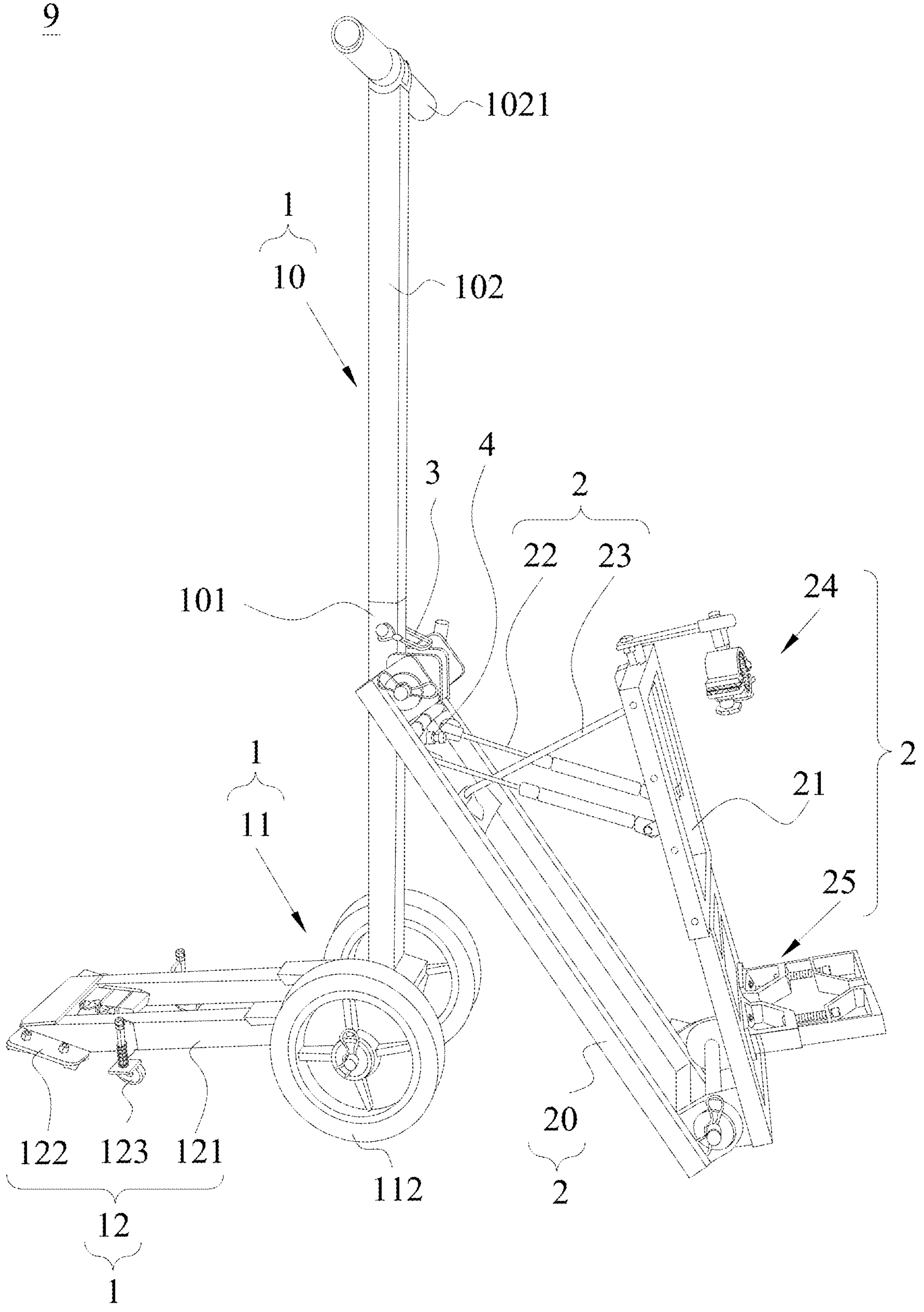
FIG. 1A is a first structure schematic view of a foldable demolition hammer trolley in accordance with a preferred embodiment of the present disclosure.

The technical characteristics of the present disclosure will become apparent in the following detailed description of the preferred embodiment with reference to the accompanying drawings. The dimensions, proportions, sizes, shapes, or application states depicted in the figures are for illustrative purposes only to explain the technical features of the invention. They do not represent actual structural designs, as explicitly stated herein.

Please refer to FIGS. 1A to 4B, which are a first and second structure schematic view, a local structure schematic view of a foldable demolition hammer trolley in accordance with a preferred embodiment of the present disclosure, an application schematic view of the foldable demolition hammer trolley setup for demolition hammer in accordance with a preferred embodiment of the present disclosure, and a first and second structure schematic view of foldable demolition hammer trolley folding diagram in accordance with a preferred embodiment of the present disclosure. The present invention discloses a foldable demolition hammer trolley 9 used for placing a demolition hammer 8 to perform floor removal operations, such as removing wood flooring glued with silicone, or removing tiles, vinyl floors, and epoxy floors. The foldable demolition hammer trolley 9 comprises a first frame 1 and a second frame 2. The first frame 1 includes a main rod 10, a moving assembly 11, and a pedal assembly 12. The moving assembly 11 is mounted at the bottom end of the main rod 10 and includes a fixed axle 111 and two wheels 112. The two wheels 112 are respectively mounted at opposite ends of the fixed axle 111 and located on opposite sides of the main rod 10. The pedal assembly 12 includes a connecting part 121 and a pedal pad 122. The pedal pad 122 is fixedly mounted on one side of the connecting part 121, while the other side of the connecting part 121 is pivotally connected to the fixed axle 111, allowing the pedal assembly 12 to be folded towards or away from the main rod 10. Additionally, one side of the pedal pad 122 may be covered with tire rubber, providing excellent wear resistance and compression resistance properties to enhance durability and lifespan.

The second frame 2 is pivoted to one side of the first frame 1, comprising a support frame part 20, a carrying frame part

21, at least one telescopic sleeve rod 22, an adjustment member 23, a first fixing assembly 24, and a second fixing assembly 25. One end of the support frame part 20 is pivoted to the main rod 10, allowing the support frame part 20 to be folded towards or away from the main rod 10. The support frame part 20 and the pedal assembly 12 are located on opposite sides of the main rod 10. The carrying frame part 21 is pivotally mounted opposite to the support frame part 20 on the main rod 10, allowing the carrying frame part 21 to be folded towards or away from the support frame part 20. One end of the telescopic sleeve rod 22 is fixedly mounted on the support frame part 20, while the other end is fixedly mounted on the carrying frame part 21, located between the support frame part 20 and the carrying frame part 21. Preferably, there are two telescopic sleeve rods 22 symmetrically positioned to provide stable support relative to the support frame part 20 and the carrying frame part 21.

The adjustment member 23 is positioned between the support frame part 20 and the carrying frame part 21 to adjust the angle between the carrying frame part 21 and the support frame part 20. Preferably, the adjustment member 23 can be a strut structure, where one end of the adjustment member 23 is fixed to either the carrying frame part 21 or the support frame part 20, and the other end is movable to abut against the support frame part 20 or the carrying frame part 21, enabling the adjustment of the support frame part 20 and the carrying frame part 21 to the desired angle and then securing it in place. Alternatively, the adjustment member 23 can also be a belt structure, where one end is fixed to the support frame part 20, and the other end is connected to the carrying frame part 21 in a movable manner, allowing the adjustment of the angle between the carrying frame part 21 and the support frame part 20 by changing the total length of the adjustment member 23.

Figure 4A:
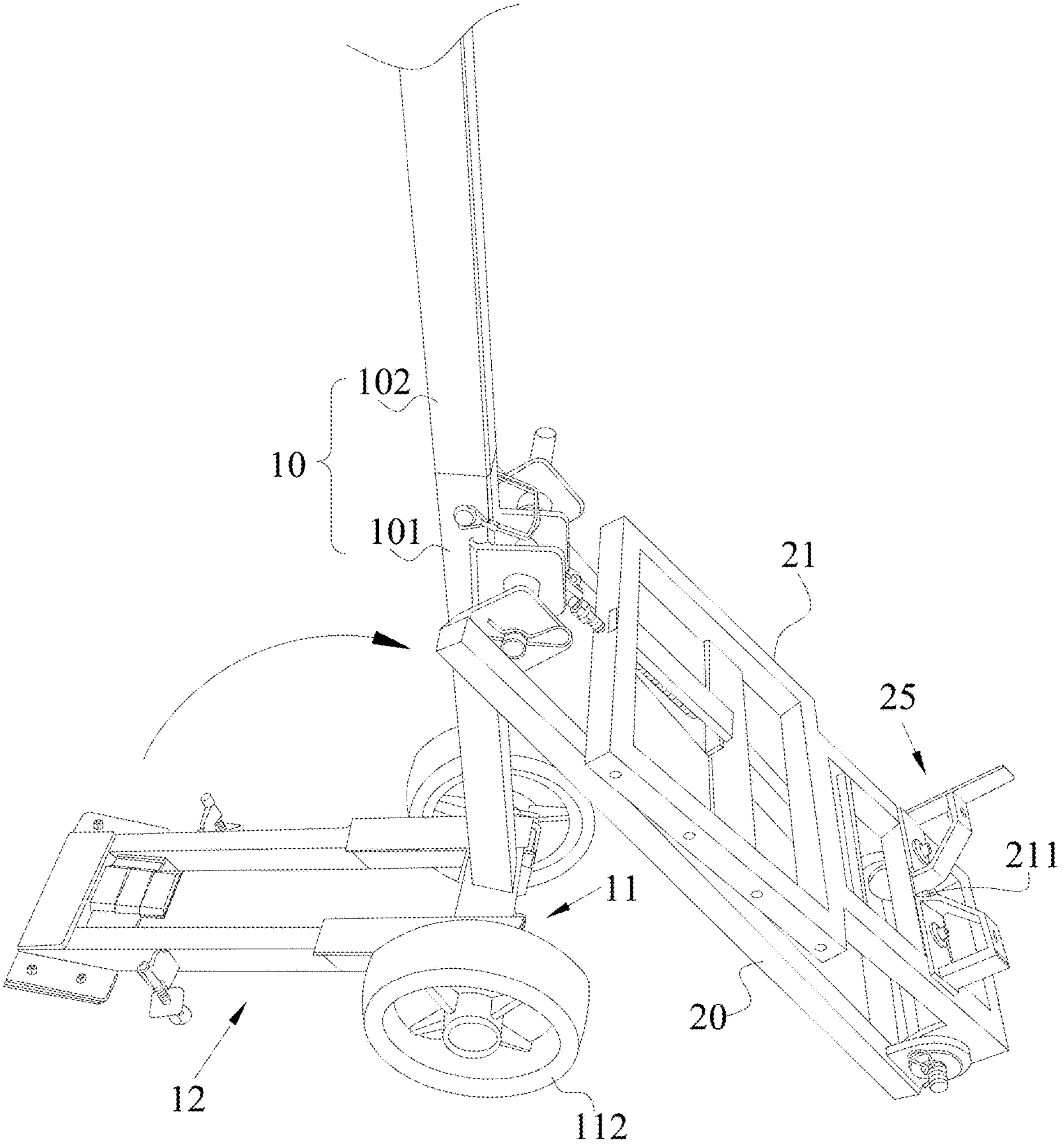
FIG. 4A is a first schematic view of foldable demolition hammer trolley folding diagram in accordance with a preferred embodiment of the present disclosure.
Figure 4B:
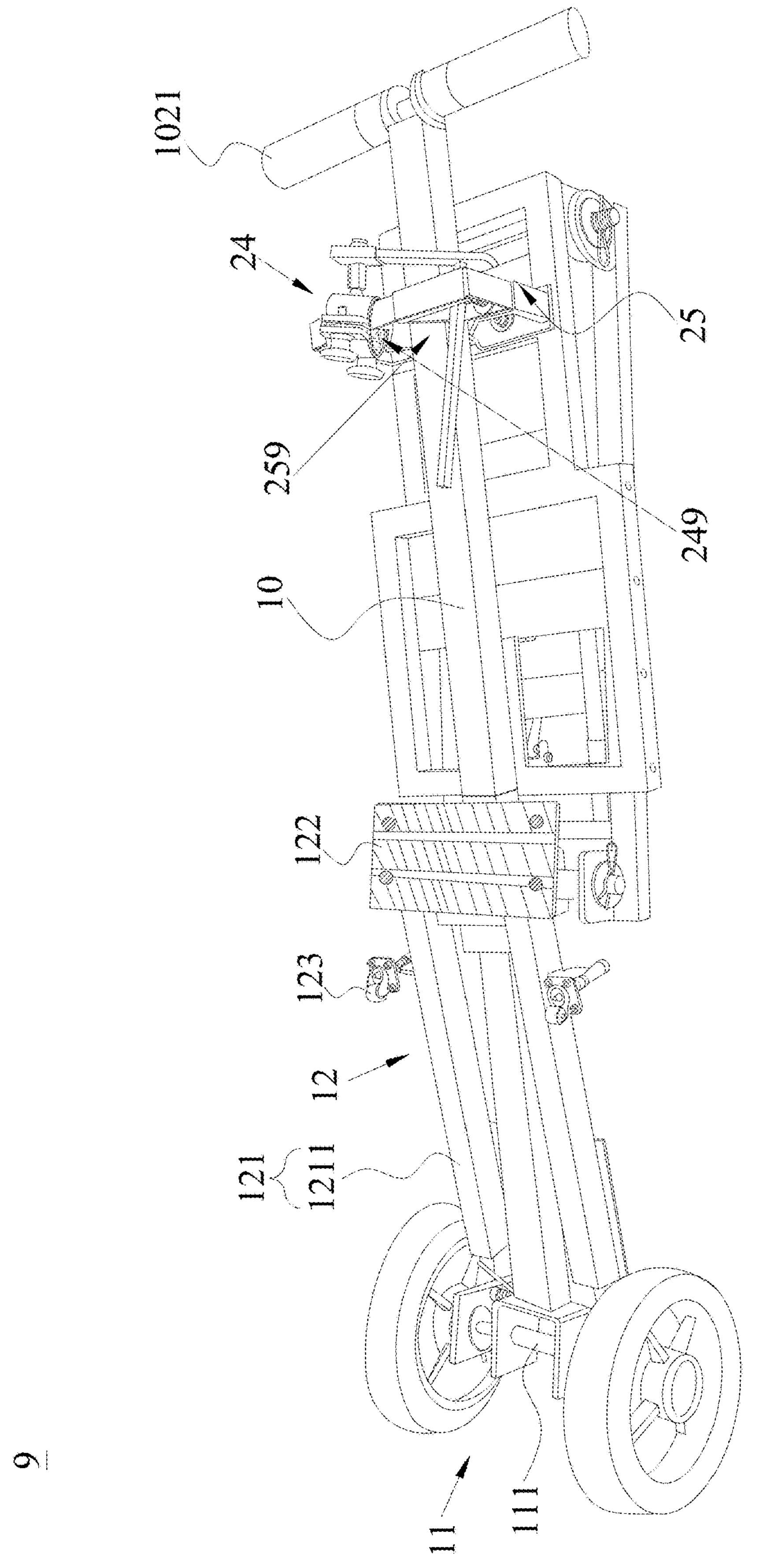
FIG. 4B is a second schematic view of foldable demolition hammer trolley folding diagram in accordance with a preferred embodiment of the present disclosure.

The first fixing assembly 24 is positioned on the carrying frame part 21 and located on the side facing the telescopic sleeve rod 22, serving to secure the handle 80 of the demolition hammer 8. In one implementation, the first fixing assembly 24 has a first space 249 and is a detachable structure, allowing the handle 80 of the demolition hammer 8 to be secured within the first space 249. Preferably, an anti-slip object, such as a non-slip mat, can be installed on the first fixing assembly 24 to make the installation of the demolition hammer 8 more stable. The second fixing assembly 25 is also installed on the carrying frame part 21, positioned on the side of the carrying frame part 21 opposite to where it connects to the telescopic sleeve rod 22 and corresponds to the first fixing assembly 24. The second fixing assembly 25 secures the body 81 of the demolition hammer 8. Similarly, in one implementation, the second fixing assembly 25 also has a second space 259 and is a detachable structure, allowing the body 81 of the demolition hammer 8 to be secured within. In this configuration, an optimal folded state is achieved by pivoting the pedal assembly 12 to fold against the main rod 10, and pivoting the support frame part 20 and carrying frame part 21 towards the top side of the main rod 10. The main rod 10 passes through the first space 249 and/or the second space 259, and can be partially secured by the first fixing assembly 24 and/or the second fixing assembly 25, forming a fully folded and secured state, making it convenient for carrying and storage. In FIGS. 4A and 4B, the first fixing assembly 24 and the second fixing assembly 25 are shown as examples of detachable structures. When folding, the first fixing assembly 24 and a part of the second fixing assembly 25 can be detached, and the main rod 10 can be flipped to overlap with the second frame 2. The detached part of the second fixing assembly 25 can then be reassembled, and the first fixing assembly 24 can be attached to either the main rod 10 or the second fixing assembly 25. The first fixing assembly 24 can even fix the second fixing assembly 25 and the main rod 10 together. Alternatively, when folding, the first fixing assembly 24 can be treated like the second fixing assembly 25, with a part of the first fixing assembly 24 being detached first, then reassembled after the main rod 10 is overlapped with the second frame 2.

Figure 3:
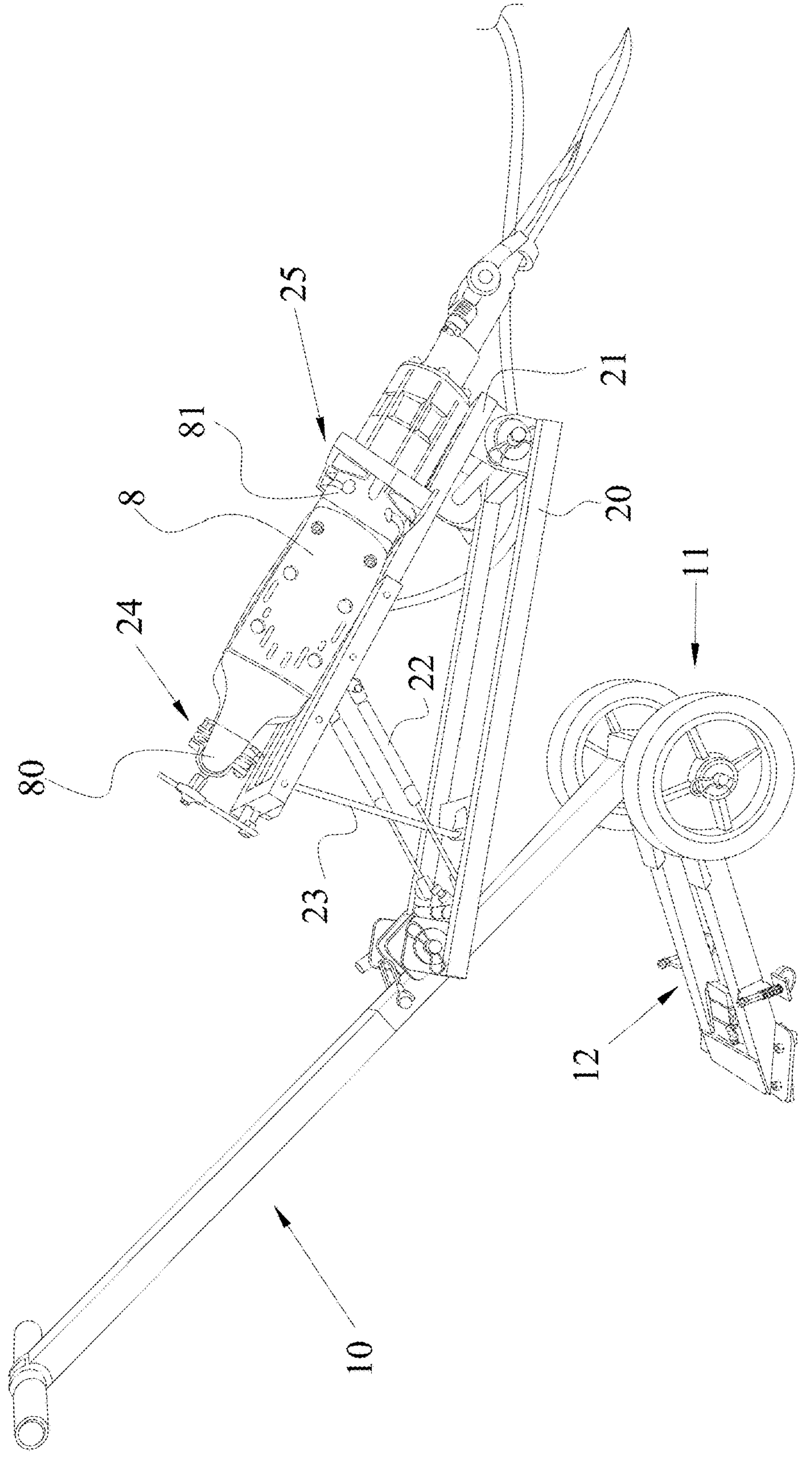
FIG. 3 is an application schematic view of the foldable demolition hammer trolley setup for demolition hammer in accordance with a preferred embodiment of the present disclosure.

In the operational state, the pedal assembly 12 of the first frame 1 is pivoted so that the pedal pad 122 of the pedal assembly 12 rests against the ground, and the carrying frame part 21 and the support frame part 20 of the second frame 2 are pivoted open. This allows the demolition hammer 8 to be fixed to the carrying frame part 21 in an inclined position, as shown in FIG. 3.

Therefore, during floor removal operations, the operator can use the structural pedal pad 122 and hold the main rod 10 to gain greater pushing force. In other words, through the foldable demolition hammer trolley 9, the operator can quickly and easily remove the floor without needing excessive back strength. This allows the operator to avoid muscle and joint strain or damage caused by prolonged use of the demolition hammer 8. Additionally, the foldable demolition hammer trolley 9 facilitates easy transportation of the demolition hammer 8 and offers advantages in mobility. The unique folding design of the foldable demolition hammer trolley 9 ensures convenient storage and travel.

Figure 1B:
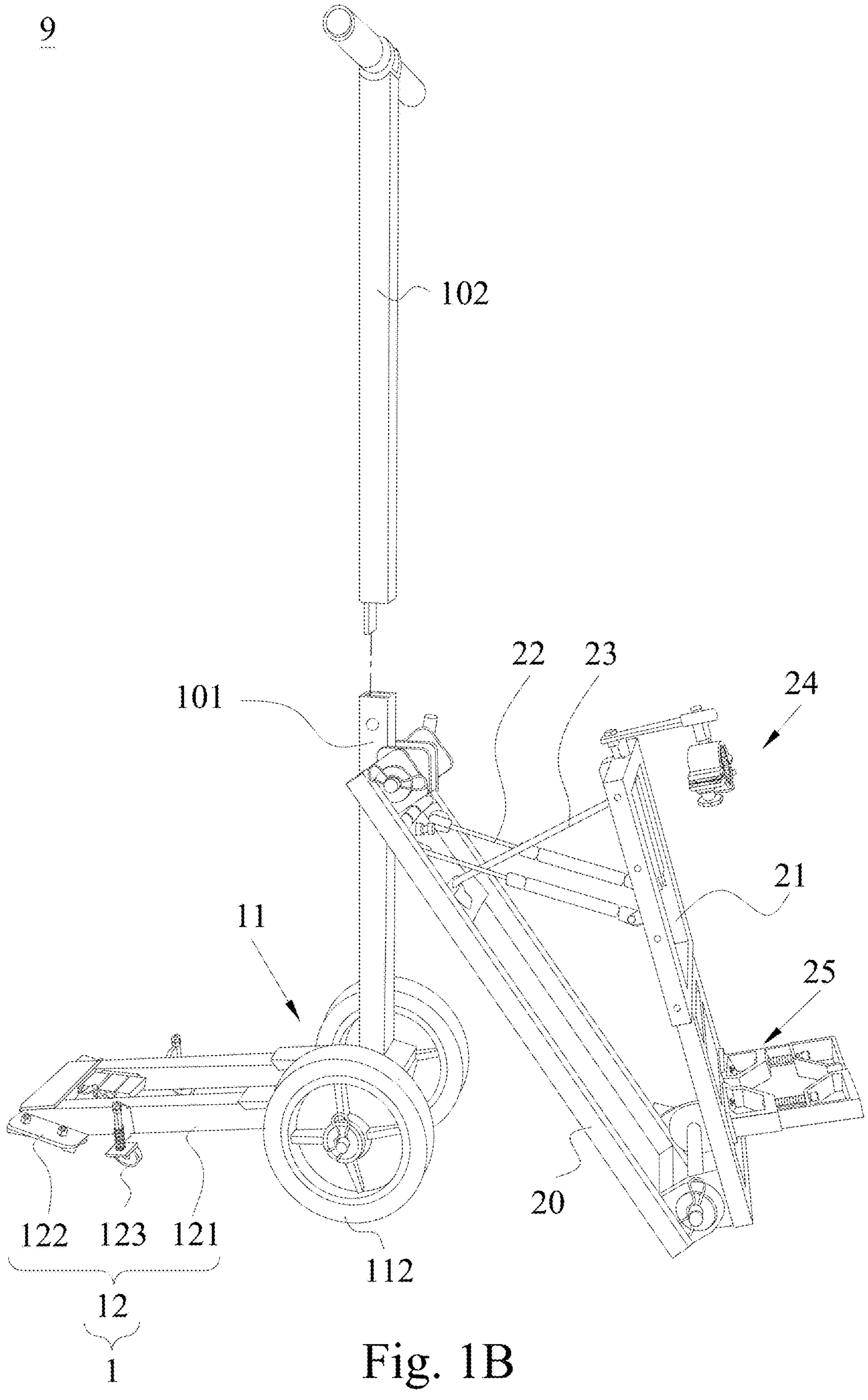
FIG. 1B is a second structure schematic view of a foldable demolition hammer trolley in accordance with a preferred embodiment of the present disclosure.
Figure 2:
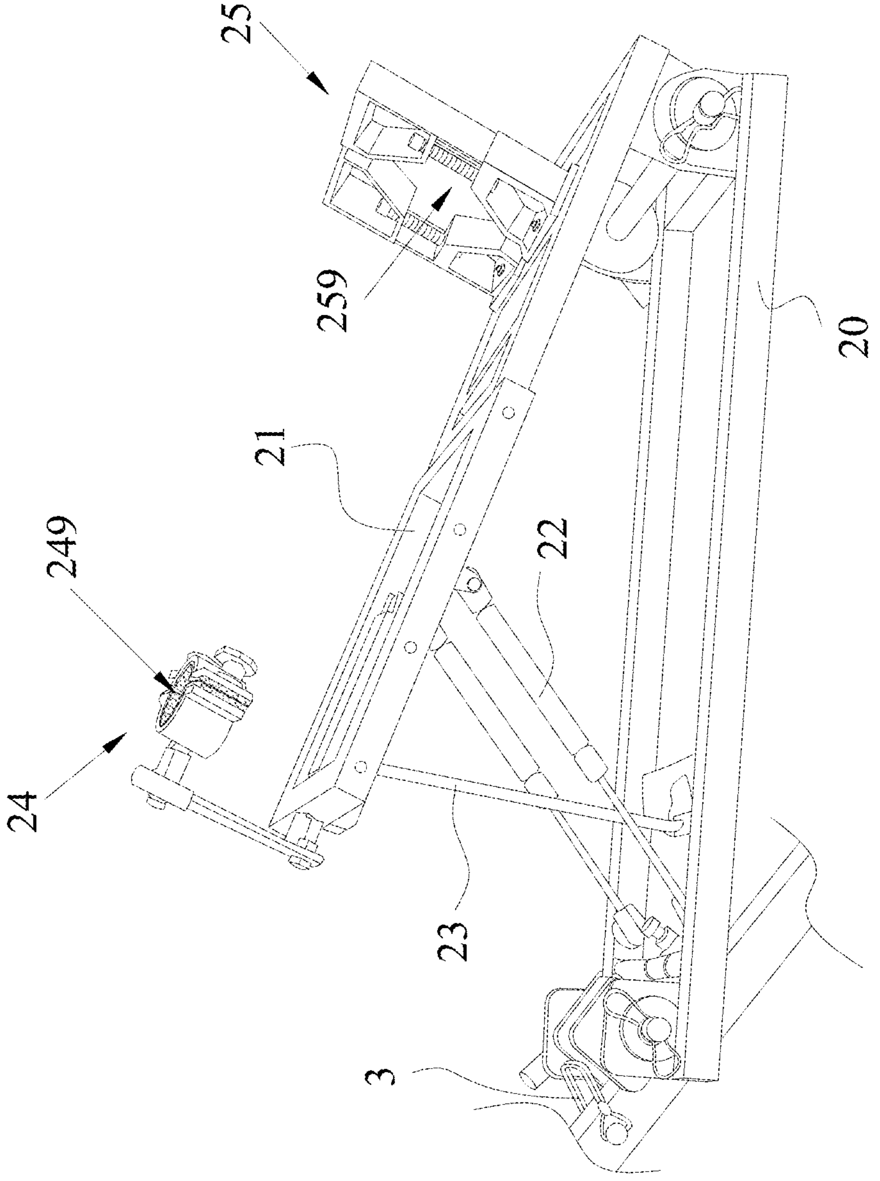
FIG. 2 is a local structure schematic view of a foldable demolition hammer trolley in accordance with a preferred embodiment of the present disclosure.

Regarding various embodiments of the components of the foldable demolition hammer trolley 9, the main rod 10 includes a first rod portion 101 and a second rod portion 102. In one embodiment, the first rod portion 101 is assembled with the moving assembly 11 at its bottom end, while the second rod portion 102 is mounted at the top end of the first rod portion 101. The second rod portion 102 is detachable from the first rod portion 101 and includes a handle 1021 at its end facing the first rod portion 101. The main rod 10 is designed to optionally include the second rod portion 102 as a detachable structure, providing versatility based on operational needs, types of floor to be removed, and the structure of the demolition hammer 8. In another embodiment, the bottom end of the second rod portion 102 is inserted into the top end of the first rod portion 101 and secured through a pin 3, offering advantages in ease of disassembly and assembly, allowing operators to adjust the structural state of the foldable demolition hammer trolley 9 more effectively. In FIG. 1B, the illustration of the pin 3 is hidden, and this is hereby clarified. Additionally, considering most application requirements for better force assistance, the length of the second rod portion 102 can be set between 25 to 30 inches, such as 26 or 27 inches, to achieve optimal length performance.

In another embodiment, a bolt 4 is positioned between the main rod 10 and the support frame part 20, allowing the main rod 10 to move back and forth relative to the pedal assembly 12. By adjusting the tightness of the bolt 4, the main rod 10 can be either slightly movable for floor demolition or fixed in place for folding and storage of the foldable demolition hammer trolley 9, depending on its application state.

In a preferable embodiment of the pedal assembly 12, it includes at least one auxiliary wheel 123 mounted on the connecting part 121. The auxiliary wheel 123 facilitates smoother movement when operators step on the pedal pad 122 and push the foldable demolition hammer trolley 9. Furthermore, the connecting part 121 comprises two rods 1211 symmetrically positioned, each hosting the auxiliary wheel 123. This symmetrical arrangement of the two rods 1211 ensures stability during movement of the foldable demolition hammer trolley 9 and assists in smooth mobility with the help of the auxiliary wheels 123. Ideally, the auxiliary wheels 123 are securely fixed to the two rods 1211 in a lockable manner, positioned alongside the two rods 1211 for enhanced assistance in movement. Additionally, considering the overall width and performance requirements of the foldable demolition hammer trolley 9, it is preferable to maintain a wheelbase of the two wheels 112 between 7 to 11 inches. This width ensures the foldable demolition hammer trolley 9 is not too wide for convenient storage and carrying, yet provides stability during operational movements. For instance, the wheelbase of the two wheels 112 can be set to approximately 9 inches, with each wheel having a width of around 2 inches. In this configuration, the maximum distance between the two wheels 112 can be around 11 inches.

In addition, concerning the telescopic rods 22, aside from the option mentioned earlier of having two telescopic rods 22, in one embodiment, the telescopic rods 22 can be elastic rods designed to provide outward pushing force to the support frame part 21. When using the demolition hammer 8, which is tilted and leaning against the support frame part 21, having the telescopic rods 22 as elastic rods helps maintain the desired angular separation between the support frame part 21 and the support frame part 20. This elastic property allows the telescopic rods 22 to exert outward force against the support frame part 21, thereby securely supporting both the support frame part 21 and the demolition hammer 8 on top of it.

Figure 5A:
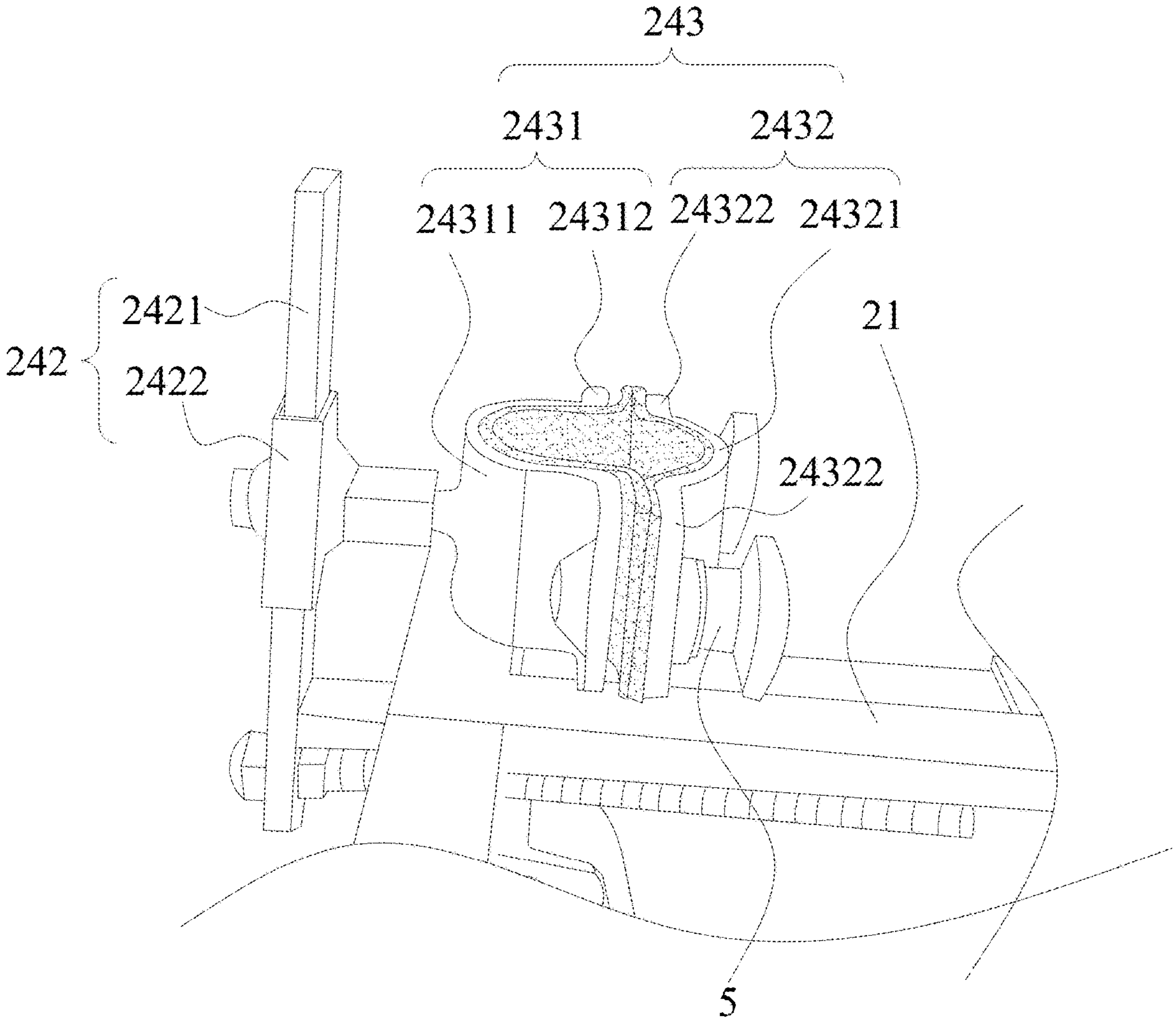
FIG. 5A is a first depict schematic diagram of the first fixing assembly which is install on the carrying frame part in accordance with a preferred embodiment of the present disclosure.
Figure 5B:
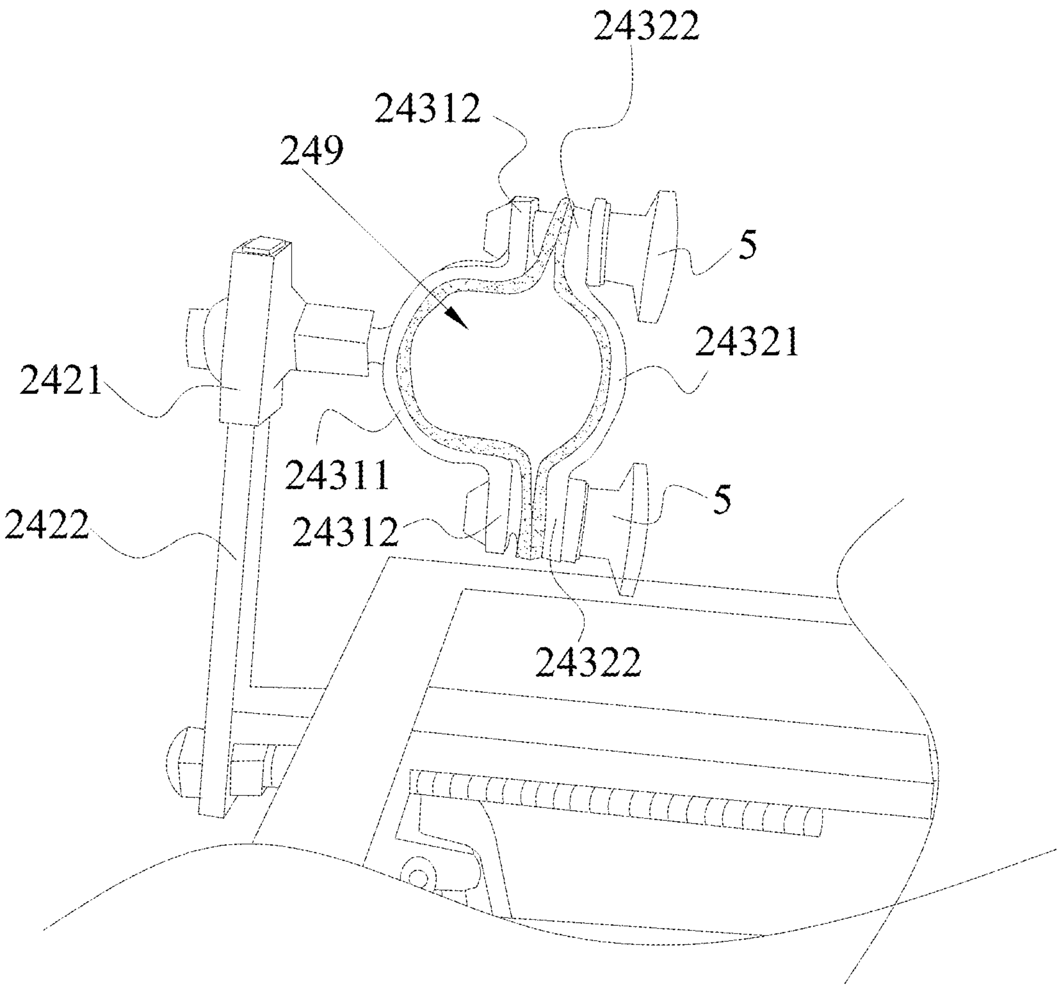
FIG. 5B is a second depict schematic diagram of the first fixing assembly which is install on the carrying frame part in accordance with a preferred embodiment of the present disclosure.

Continuing with the description of the first fixed component 24, please refer to FIGS. 5A and 5B, which are a first depict schematic diagram and a second depict schematic diagram of partial structures of a preferred embodiment of the first fixed component in this invention. In a preferable embodiment, the first fixed component 24 includes a length adjustment piece 242 and a clamping piece 243. One end of the length adjustment piece 242 is fixed to the support frame part 21. The clamping piece 243 comprises a first body 2431 and a second body 2432 arranged oppositely. The first body 2431 is fixed relative to the support frame part 21 at the end pivot setting, with the length adjustment piece 242 provided to adjust the distance between the clamping piece 243 and the support frame part 21. The clamping piece 243 is pivotable relative to the length adjustment piece 242. The handle 80 of the demolition hammer 8 is secured within the space formed by framing of the first body 2431 and the second body 2432, corresponding to the previously mentioned first space 249. Thus, the configuration of the first fixed component 24 can be adjusted according to the model and structure of the demolition hammer 8, allowing the foldable demolition hammer trolley 9 to be used with various types of demolition hammers 8.

Furthermore, the length adjustment piece 242 may include a fixed rod 2421 and a sliding component 2422. The fixed rod 2421 is fixed to the support frame part 21, while one end of the sliding component 2422 is sleeved on the fixed rod 2421, and the other end is pivotally connected to the clamping piece 243. The sliding component 2422 is capable of sliding relative to the fixed rod 2421, facilitating easy adjustment of the clamping piece 243 and the distance between the clamping piece 243 and the support frame part 21. Moreover, in one embodiment, the first body 2431 of the clamping piece 243 has a first arc section 24311 and two first extension sections 24312 located on opposite sides of the first arc section 24311. Similarly, the second body 2432 has a second arc section 24321 and two second extension sections 24322 located on opposite sides of the second arc section 24321, so that the first body 2431 and the second body 2432 are respectively Ω-shaped. The first extension sections 24312 and the second extension sections 24322 are designed to abut against each other and are equipped with a locking piece 5 at their positions, allowing the first arc section 24311 and the second arc section 24321 to clamp together, forming a circular space where the handle 80 of the demolition hammer 8 can be securely clamped. The locking piece 5 can adjust the distance between the first body 2431 and the second body 2432, thereby changing the size of the space formed by clamping the first arc section 24311 and the second arc section 24321. This arrangement allows operators to quickly and conveniently adjust the assembly state of the clamping piece 243. Specifically, the locking piece 5 can be loosened first to place the handle 80 of the demolition hammer 8 between the first body 2431 and the second body 2432, adjust the second body 2432 according to the handle 80 to the desired position, and finally lock the locking piece 5.

Figure 6A:
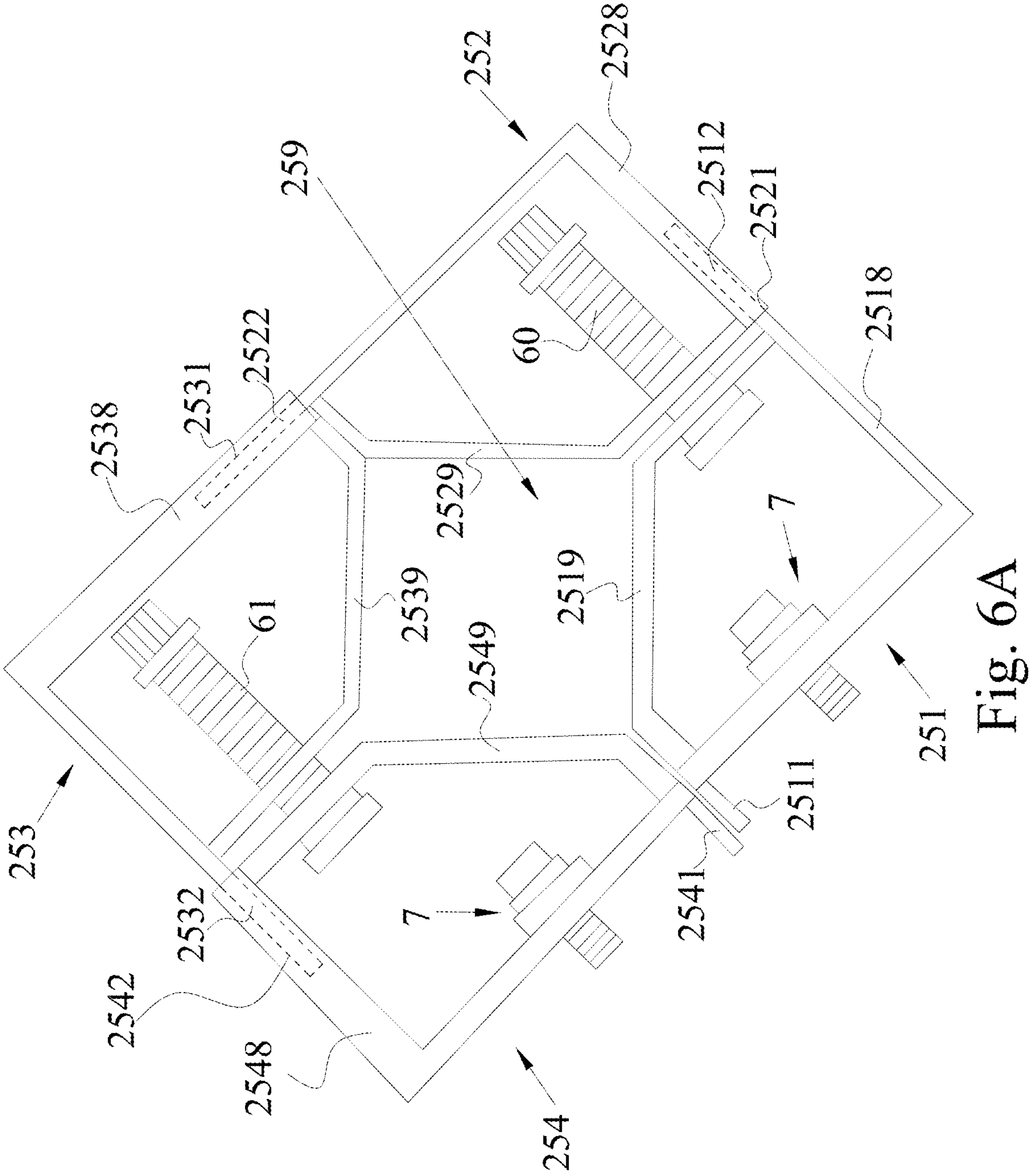
FIG. 6A is a first depict schematic diagram of the second fixing assembly in accordance with a preferred embodiment of the present disclosure.
Figure 6B:
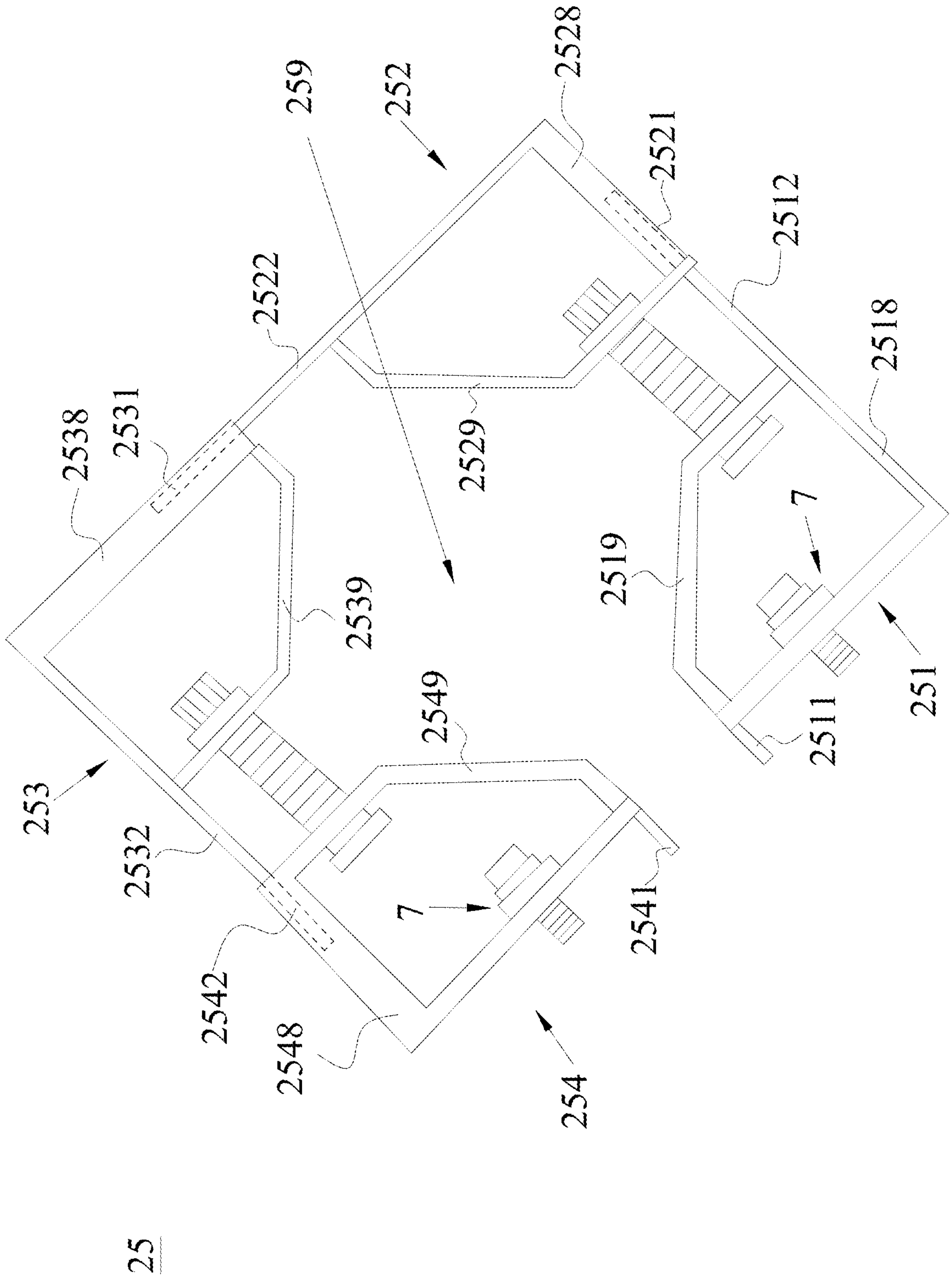
FIG. 6B is a second depict schematic diagram of the second fixing assembly in accordance with a preferred embodiment of the present disclosure.

Next, please also refer to FIGS. 6A and 6B, which are a first depict schematic diagram and a second depict schematic diagram of partial structures of a preferred embodiment of the second fixed component in this invention. The second fixed component 25 can be designed either as a monolithic structure or assembled from multiple parts. If assembled from multiple parts, the second fixed component 25 offers the advantage of easy partial repair and replacement, while enabling adjustable movement relative to the fixed state of the demolition hammer 8. In a preferred embodiment, the second fixed component 25 may include a first part body and a second part body. The first part body is used for assembly with the support frame part, while the second part body is used to mutually assemble with the first part body, thereby achieving the effect of adjusting their distance in one direction. In addition to this configuration, as indicated in this example, the second fixed component 25 may consist of a first fixed main body 251, a second fixed main body 252, a third fixed main body 253, and a fourth fixed main body 254. One side of the first fixed main body 251 is mutually connected to the support frame part 21, and the other side of the first fixed main body 251 is assembled with the second fixed main body 252, the third fixed main body 253 is located on one side of the second fixed main body 252 and is connected to it, and the fourth fixed main body 254 is positioned on one side of the first fixed main body 251, and one side of the fourth fixed main body 254 is assembled with the carrying frame part 21, and the other side of the fourth fixed main body 254 is assembled with the third fixed main body 253. The first fixed main body 251, the second fixed main body 252, the third fixed main body 253, and the fourth fixed main body 254 are combined to form an outer contour in the shape of a quadrilateral frame. The body 81 of the demolition hammer 8 is fixed in the space formed by the first fixed main body 251, the second fixed main body 252, the third fixed main body 253, and the fourth fixed main body 254, corresponding to the previously mentioned first space 249, and the distance between the first fixed main body 251, the second fixed main body 252, the third fixed main body 253, and the fourth fixed main body 254 can be adjusted. Through the aforementioned structural design, it is advantageous in terms of part replacement; if any part is damaged, only the damaged part needs to be replaced, thus effectively saving material costs. At the same time, it allows the second fixed component 25 to adjust the distance between parts in two directions.

Furthermore, in a preferred embodiment, the support frame part 21 has a track 211. The first fixed main body 251 and the fourth fixed main body 254 are respectively movably installed in the track 211 and can move within the track 211 to adjust the distance between the first fixed main body 251 and the fourth fixed main body 254. The first fixed main body 251 has a first assembly insert 2512. The second fixed main body 252 has a second assembly insert 2522 and a first assembly hole 2521. The third fixed main body 253 has a third assembly insert 2532 and a second assembly hole 2531. The fourth fixed main body 254 further has a third assembly hole 2542. The first assembly insert 2512 is inserted into the first assembly hole 2521, the second assembly insert 2522 is inserted into the second assembly hole 2531, and the third assembly insert 2532 is inserted into the third assembly hole 2542. The first assembly insert 2512 can slide within the first assembly hole 2521 to adjust the distance between the first fixed main body 251 and the second fixed main body 252. The second assembly insert 2522 can slide within the second assembly hole 2531 to adjust the distance between the second fixed main body 252 and the third fixed main body 253. The third assembly insert 2532 can slide within the third assembly hole 2542 to adjust the distance between the third fixed main body 253 and the fourth fixed main body 254. Through these structural features, the first fixed main body 251, the second fixed main body 252, the third fixed main body 253, and the fourth fixed main body 254 have the advantage of easy assembly and adjustment, providing enhanced convenience for operators in applications.

Preferably, the first fixed main body 251 and the fourth fixed main body 254 are respectively installed in the track 211 through a connecting piece 7. The first fixed main body 251 further has a first carrying insert 2511, and the fourth fixed main body 254 further has a second carrying insert 2541. The first carrying insert 2511 and the second carrying insert 2541 are placed within the track 211. By means of the first carrying insert 2511 and the second carrying insert 2541, the first fixed main body 251 and the fourth fixed main body 254 can be more stable when moving along the track 211. This arrangement also provides a more stable structural state between the first fixed main body 251, the fourth fixed main body 254, and the carrying frame part 21. The connecting piece 7 can be, for example, a screw and a movable screw component. The movable screw component is positioned on the track 211. This allows the first fixed main body 251 and the fourth fixed main body 254 to be installed on the track 211 in a locked manner through the connecting piece 7. The movable screw component enables the first fixing body 251 and the fourth fixing body 254 to move along the track 211.

Here's a refined example regarding the structure of the first fixed main body 251, the second fixed main body 252, the third fixed main body 253, and the fourth fixed main body 254. The first fixed main body 251 includes a first L-shaped section 2518 and a first dividing section 2519. The first dividing section 2519 is inclined and connected at both ends to form a first pentagonal frame with the first L-shaped section 2518. The first carrying insert 2511 extends from one end of the first L-shaped section 2518, and the first assembly insert 2512 extends from the other end of the first L-shaped section 2518 in the opposite direction to the first carrying insert 2511.

The second fixed main body 252 includes a second L-shaped section 2528 and a second dividing section 2529. The second dividing section 2529 is inclined and connected at both ends to form a second pentagonal frame with the second L-shaped section 2528. The second assembly insert 2522 extends from one end of the second L-shaped section 2528, and the first assembly hole 2521 is formed by a recess at the other end of the second L-shaped section 2528.

The third fixed main body 253 includes a third L-shaped section 2538 and a third dividing section 2539. The third dividing section 2539 is inclined and connected at both ends to form a third pentagonal frame with the third L-shaped section 2538. The third assembly insert 2532 extends from one end of the third L-shaped section 2538, and the second assembly hole 2531 is formed by a recess at the other end of the third L-shaped section 2538.

The fourth fixed main body 254 includes a fourth L-shaped section 2548 and a fourth dividing section 2549. The fourth dividing section 2549 is inclined and connected at both ends to form a fourth pentagonal frame with the fourth L-shaped section 2548. The third assembly hole 2542 is formed by a recess at one end of the fourth L-shaped section 2548, and the second carrying insert 2541 extends from the other end of the fourth L-shaped section 2548. Wherein the first pentagonal frame and the second pentagonal frame are arranged in a mirrored configuration, the second pentagonal frame and the third pentagonal frame are arranged in a mirrored configuration, the third pentagonal frame and the fourth pentagonal frame are arranged in a mirrored configuration, and the fourth pentagonal frame are arranged in a mirrored configuration with the first pentagonal frame.

Through these structural features, the second fixed component 25 can effectively reduce manufacturing costs (by designing each part as a frame), while maintaining a certain degree of fixed strength and structural rigidity.

To enhance the combined strength of the first fixed main body 251, the second fixed main body 252, the third fixed main body 253, and the fourth fixed main body 254 after adjusting the spacing, the first fixed main body 251 and the second fixed main body 252 are further secured together by a first screw 60. The first screw 60 passes through the first dividing section 2519 and the second dividing section 2529. Similarly, the third fixed main body 253 and the fourth fixed main body 254 are secured together by a second screw 61 passing through the third dividing section 2539 and the fourth dividing section 2549. This locking method securely fixes the first fixed main body 251, the second fixed main body 252, the third fixed main body 253, and the fourth fixed main body 254, providing operational convenience.

Considering the typical structural type of the demolition hammer 8, the maximum distance between the spaces formed by clamping the first fixed main body 251, the second fixed main body 252, the third fixed main body 253, and the fourth fixed main body 254 ranges from 2 to 4 inches. This allows the second fixed component 25 to be designed to an appropriate size while also meeting the structural requirements of most demolition hammer 8 configurations.

Figure 7:
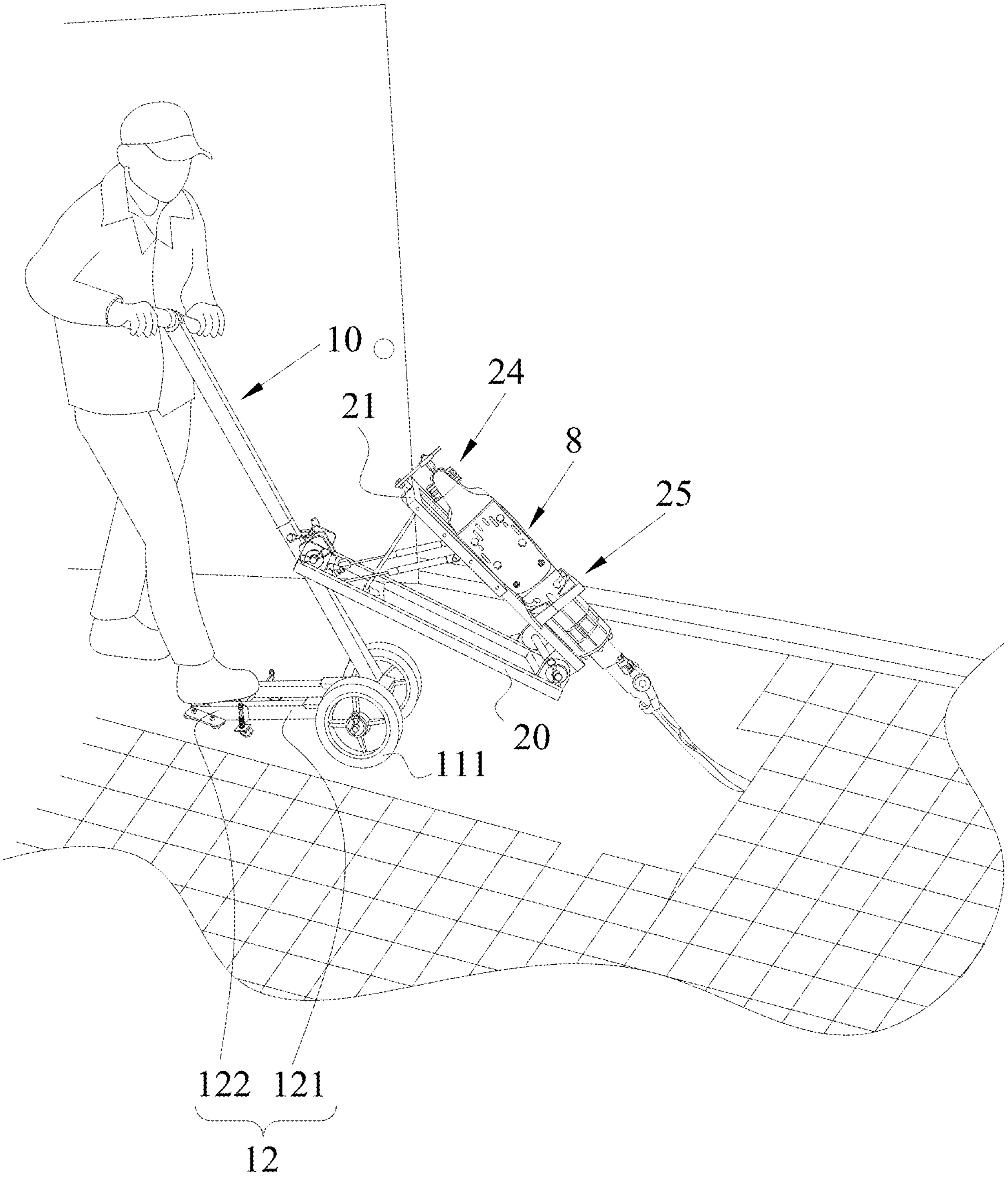
FIG. 7 is a first depict schematic diagram showing the foldable demolition hammer trolley application in floor demolition operation in accordance with a preferred embodiment of the present disclosure.
Figure 8:
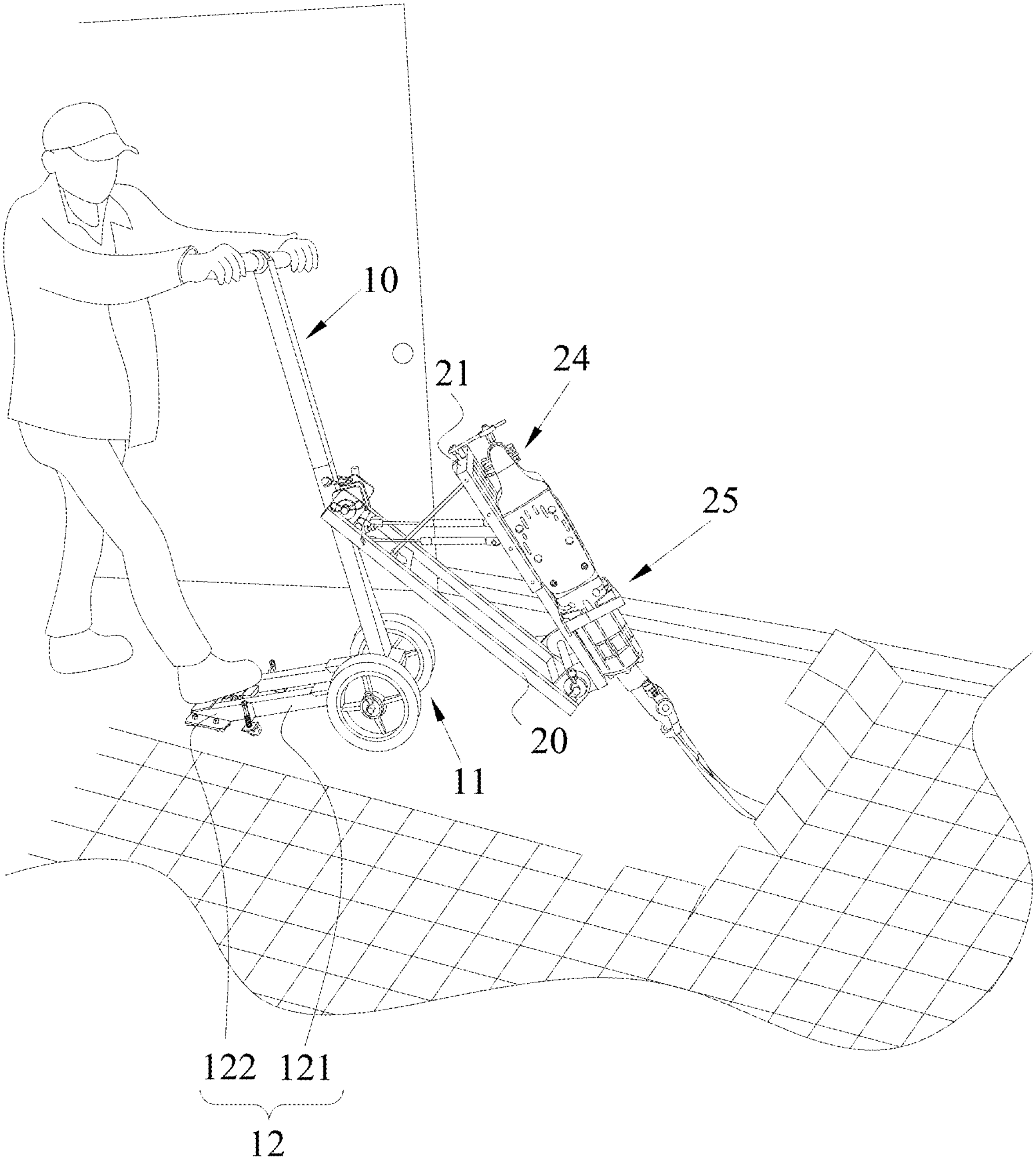
FIG. 8 is a second depict schematic diagram showing the foldable demolition hammer trolley application in floor demolition operation in accordance with a preferred embodiment of the present disclosure.

Please also refer to FIGS. 7 and 8, which are a first depict schematic diagram and a second depict schematic diagram of the application of a preferred embodiment of the foldable demolition hammer trolley in floor demolition operations in this invention. During floor demolition operations, the pedal assembly 12 pivots so that the pedal pad 122 rests against the ground. The carrying frame part 21 and the support frame part 20 pivot into an expanded state. The demolition hammer 8 is then fixed to the carrying frame part 21 and inclined against it. The operator then steps on the pedal pad 122 and pushes forward on the main rod 10, causing the second frame 2 to move forward. The drill part of the demolition hammer 8 can thus pry the floor off the ground. By repeating these actions, floor demolition operations can be performed quickly and easily. In this method of application, the foldable demolition hammer trolley 9 allows the operator to apply greater force to the demolition hammer 8 through leverage, making it easier to remove the floor. Moreover, in this operating process, the operator does not need to exert excessive force on their back muscles or joints over long periods of operation, thereby effectively mitigating common adverse effects associated with using the demolition hammer 8. Additionally, when the main rod 10 includes a removable second rod section 102, for example, when working on floor types that are easier to remove, removing the second rod section 102 can enhance operational speed. It should be noted that the entire weight of the foldable demolition hammer trolley 8, manufactured according to the above structural patterns, is approximately 50 lbs, emphasizing its lightweight characteristics.

In summary, the foldable demolition hammer trolley of the present invention is designed with a special frame structure. During floor demolition operations, it allows operators to apply sufficient force to push the demolition hammer without relying heavily on their back muscles, leveraging the principle of leverage. This effectively addresses the adverse effects that operators commonly face when relying solely on their physical strength over extended periods of work. Moreover, the foldable nature of this invention enhances its convenience for storage, transportation, and travel. The structure of the invention includes many detailed technical features. For example, the upper side portion of the main rod is designed to be detachable, allowing operators to adjust the assembly state of the foldable demolition hammer trolley according to their needs. Additionally, auxiliary wheels can be added to the pedal assembly to facilitate smoother movement of the foldable demolition hammer trolley. Furthermore, specific structural configurations are disclosed for the first fixed component and the second fixed component, enabling adjustable spacing or directional positioning functions. This detailed design enhances the overall performance and efficiency in various aspects. The invention also proposes optimal dimensional conditions for certain parts to ensure that the foldable demolition hammer trolley achieves appropriate size and optimal application efficiency. Overall, the invention introduces advanced features that not only improve operational ergonomics and efficiency but also enhance the versatility and practicality of the foldable demolition hammer trolley in various operational scenarios and storage conditions.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A foldable demolition hammer trolley, for setting a demolition hammer to perform floor removal operations, comprising:
- a first frame, comprising:
- a main rod;
- a moving assembly, configured at a bottom end of the main rod, comprising a fixed axle and two wheels, the two wheels being respectively arranged at opposite ends of the fixed axle and located on opposite sides of the main rod; and
- a pedal assembly, comprising a connecting part and a pedal pad, the pedal pad being fixed on one side of the connecting part, the other side of the connecting part being pivotally connected with the fixed axle, so that the pedal assembly can be folded close to or away from the main rod; and
- a second frame, pivotally configured on one side of the first frame, comprising:
- a support frame part, one end pivotally configured on the main rod, so that the support frame part can be folded close to or away from the main rod, and the support frame part and the pedal assembly being located on opposite sides of the main rod;
- a carrying frame part, pivotally connected to the other end of the end where the support frame part and the main rod are pivotally connected, so that the carrying frame part can be folded close to or away from the support frame part;
- at least one telescopic sleeve rod, one end fixed on the support frame part, the other end fixed on the carrying frame part and located between the support frame part and the carrying frame part;
- an adjustment member, configured between the support frame part and the carrying frame part, to adjust an angle between the carrier frame part and the carrying frame part;
- a first fixing assembly, configured on the carrying frame part and is located on the opposite side of the telescopic sleeve rod, to fix a handle of the demolition hammer; and
- a second fixing assembly, configured on the carrying frame part and is located on the opposite side of the telescopic sleeve rod and corresponding to the first fixing assembly, the second fixing assembly being used to fix a body of the demolition hammer;
- wherein in the use state, the pedal assembly of the first frame is pivoted so that the pedal pad of the pedal assembly is pressed against the ground, the carrying frame part and the support frame part of the second frame are pivotally unfolded, allowing the demolition hammer to be fixed to the carrier frame part and positioned in an inclined state.

2. The foldable demolition hammer trolley of claim 1, wherein the pedal assembly further comprises at least one auxiliary wheel, the auxiliary wheel being arranged on the connecting part.

3. The foldable demolition hammer trolley of claim 2, wherein the connecting part comprises two rods, the two rods being symmetrically arranged, and the auxiliary wheel is respectively arranged on each of the two rods.

4. The foldable demolition hammer trolley of claim 1, wherein the first fixing assembly comprises a length adjustment piece and a clamping piece, one end of the length adjustment piece is fixed to the carrying frame part, and the clamping piece comprises a first body and a second body arranged oppositely, the first body and the length adjustment piece are pivotally connected relative to the ends fixed to the carrying frame part; the length adjustment piece is configured to adjust the distance between the clamping piece and the carrying frame part, and the clamping piece is pivotable relative to the length adjustment piece; the handle of the demolition hammer is fixed in a space formed by the first body and the second body.

5. The foldable demolition hammer trolley of claim 4, wherein the length adjustment piece comprises a fixed rod and a sliding component, the fixed rod being fixed to the carrying frame part, and one end of the sliding component is sleeved on the fixed rod, while the other end is pivotally arranged with the clamping piece; the sliding component is slidable relative to the fixed rod.

6. The foldable demolition hammer trolley of claim 4, wherein the first body has a first arc section and two first extension sections, the two first extension sections being respectively located on opposite sides of the first arc section; the second body has a second arc section and two second extension sections, the two second extension sections being respectively located on opposite sides of the second arc section, making the first body and the second body each present an Q-shape; the two first extension sections and the two second extension sections are arranged to butt against each other, and a locking piece is arranged at the positions of the two first extension sections and the two second extension sections.

7. The foldable demolition hammer trolley of claim 1, wherein the second fixing assembly comprises a first fixed main body, a second fixed main body, a third fixed main body, and a fourth fixed main body, with one side of the first fixed main body being assembled with the carrying frame part; the second fixed main body is assembled on the opposite side of the first fixed main body relative to the carrying frame part, the third fixed main body is located on one side of the second fixed main body and assembled with the second fixed main body, and the fourth fixed main body is located on one side of the first fixed main body, with one side of the fourth fixed main body being assembled with the carrying frame part and the other side being assembled with the third fixed main body; the first fixed main body, the second fixed main body, the third fixed main body, and the fourth fixed main body are combined to form an outer contour in the shape of a quadrilateral frame, and the body of the demolition hammer is fixed in a space formed by the first fixed main body, the second fixed main body, the third fixed main body, and the fourth fixed main body, and the distance between the first fixed main body, the second fixed main body, the third fixed main body, and the fourth fixed main body is adjustable.

8. The foldable demolition hammer trolley of claim 7, wherein the carrying frame part has a track, the first fixed main body and the fourth fixed main body are respectively movably installed in the track and can move within the track to adjust the distance between the first fixed main body and the fourth fixed main body; the first fixed main body has a first assembly insert, the second fixed main body has a second assembly insert and a first assembly hole, the third fixed main body has a third assembly insert and a second assembly hole, and the fourth fixed main body has a third assembly hole; the first assembly insert is inserted into the first assembly hole, the second assembly insert is inserted into the second assembly hole, the third assembly insert is inserted into the third assembly hole, and the first assembly insert can slide within the first assembly hole to adjust the distance between the first fixed main body and the second fixed main body; the second assembly insert can slide within the second assembly hole to adjust the distance between the second fixed main body and the third fixed main body, and the third assembly insert can slide within the third assembly hole to adjust the distance between the third fixed main body and the fourth fixed main body.

9. The foldable demolition hammer trolley of claim 8, wherein the first fixed main body and the fourth fixed main body are respectively installed in the track through a connecting piece; the first fixed main body also has a first carrying insert, the fourth fixed main body also has a second carrying insert, and both the first carrying insert and the second carrying insert are placed within the track.

10. The foldable demolition hammer trolley of claim 9, wherein the first fixed main body further has a first L-shaped section and a first dividing section, with the first dividing section being inclined and both ends respectively connected to the first L-shaped section to form a first pentagonal frame; the first carrying insert extends from one end edge of the first L-shaped section, the first assembly insert extends from the other end edge of the first L-shaped section in the opposite direction to the first carrying insert; the second fixed main body further has a second L-shaped section and a second dividing section, with the second dividing section being inclined and both ends respectively connected to the second L-shaped section to form a second pentagonal frame; the second assembly insert extends from one end edge of the second L-shaped section, and the first assembly hole is recessed from the other end edge of the second L-shaped section; the third fixed main body further has a third L-shaped section and a third dividing section, with the third dividing section being inclined and both ends respectively connected to the third L-shaped section to form a third pentagonal frame; the third assembly insert extends from one end edge of the third L-shaped section, and the second assembly hole is recessed from the other end edge of the third L-shaped section; the fourth fixed main body further has a fourth L-shaped section and a fourth dividing section, with the fourth dividing section being inclined and both ends respectively connected to the fourth L-shaped section to form a fourth pentagonal frame; the third assembly hole is recessed from one end edge of the fourth L-shaped section, and the second carrying insert extends from the other end of the fourth L-shaped section; wherein the first pentagonal frame and the second pentagonal frame are arranged in a mirrored configuration, the second pentagonal frame and the third pentagonal frame are arranged in a mirrored configuration, the third pentagonal frame and the fourth pentagonal frame are arranged in a mirrored configuration, and the fourth pentagonal frame are arranged in a mirrored configuration with the first pentagonal frame.

11. The foldable demolition hammer trolley of claim 10, wherein the first fixed main body and the second fixed main body are further assembled and fixed with a first screw, with the first screw passing through the first dividing section and the second dividing section; the third fixed main body and the fourth fixed main body are further assembled and fixed with a second screw, with the second screw passing through the third dividing section and the fourth dividing section.

12. The foldable demolition hammer trolley of claim 7, wherein the maximum distance of the space formed by the first fixed main body, the second fixed main body, the third fixed main body, and the fourth fixed main body is 2 to 4 inches.

13. The foldable demolition hammer trolley of claim 1, wherein the main rod comprises a first rod portion and a second rod portion, with the bottom end of the first rod portion being assembled with the moving assembly, and the second rod portion being assembled at the top end of the first rod portion; the second rod portion has a detachable structure relative to the first rod portion, and the end of the second rod portion that is assembled with the first rod portion is provided with a handle.

14. The foldable demolition hammer trolley of claim 13, wherein the bottom end of the second rod portion is inserted into the top end of the first rod portion and is assembled and fixed to the first rod portion through a pin.

15. The foldable demolition hammer trolley of claim 14, wherein the length of the second rod portion is 25 to 30 inches.

16. The foldable demolition hammer trolley of claim 1, wherein the adjustment member is a band, with one end fixed to the support frame part and the other end connected to the carrying frame part in a movable manner, allowing the adjustment of the total length of the adjustment member to change the angle between the carrying frame part and the support frame part.

17. The foldable demolition hammer trolley of claim 16, wherein the telescopic sleeve rod is an elastic rod, which provides a force to push the carrying frame part outward.

18. The foldable demolition hammer trolley of claim 1, wherein a bolt is provided between the main rod and the support frame part, allowing the main rod to move back and forth relative to the pedal assembly by adjusting the tightness of the bolt.

19. The foldable demolition hammer trolley of claim 1, wherein the first fixing assembly has a first space and is a detachable structure, and the second fixing assembly has a second space and is a detachable structure, so that in the folded state, the main rod passes through the first space and/or the second space and is secured.

20. The foldable demolition hammer trolley of claim 1, wherein the wheelbase of the two wheels is 7 to 11 inches.

* * * * *